United States Patent
Wang et al.

(10) Patent No.: US 7,483,761 B2
(45) Date of Patent: Jan. 27, 2009

(54) SYSTEM AND METHOD OF DEMAND AND CAPACITY MANAGEMENT

(75) Inventors: Chung-Wen Wang, Hsin-Chu (TW); Chii-ming M. Wu, Hsinchu (TW); Edwin Liou, Taipei (TW); Chiang-Sheng Chin, Kee-Lung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1250 days.

(21) Appl. No.: 10/640,776

(22) Filed: Aug. 14, 2003

(65) Prior Publication Data
US 2005/0038684 A1 Feb. 17, 2005

(51) Int. Cl.
G06F 19/00 (2006.01)
G06F 9/46 (2006.01)
G05B 19/418 (2006.01)
G06Q 10/00 (2006.01)

(52) U.S. Cl. ............... 700/100; 700/99; 705/8; 705/28

(58) Field of Classification Search ............. 705/8, 705/28
See application file for complete search history.

(56) References Cited

U.S. PATENT DOCUMENTS

| | | | | |
|---|---|---|---|---|
| 6,188,989 B1 * | 2/2001 | Kennedy | ............. | 705/8 |
| 6,393,332 B1 | 5/2002 | Gleditsch et al. | | |
| 6,463,345 B1 | 10/2002 | Peachey-Kountz et al. | | |
| 6,477,660 B1 * | 11/2002 | Sohner | ............. | 714/1 |
| 6,711,449 B1 * | 3/2004 | Miyahara et al. | ............. | 700/100 |
| 6,920,365 B2 * | 7/2005 | Chao et al. | ............. | 700/100 |
| 6,989,603 B2 * | 1/2006 | Zhang | ............. | 257/774 |
| 7,003,365 B1 * | 2/2006 | Yen et al. | ............. | 700/99 |
| 7,073,160 B2 * | 7/2006 | Chao et al. | ............. | 716/19 |
| 7,085,730 B1 * | 8/2006 | Tsao et al. | ............. | 705/10 |
| 7,130,707 B2 * | 10/2006 | Chao et al. | ............. | 700/100 |

(Continued)

FOREIGN PATENT DOCUMENTS

TW    452718    9/2001

(Continued)

OTHER PUBLICATIONS

Singapore Office Action issued Jun. 26, 2006.

(Continued)

*Primary Examiner*—Albert DeCady
*Assistant Examiner*—Sunray R Chang
(74) *Attorney, Agent, or Firm*—Thomas, Kayden, Horstemeyer & Risley

(57) ABSTRACT

A new business model of supply chain management for IC foundry and a system and method of demand and capacity management with machine-time accuracy are provided. The system includes an allocation planning module, an order management module, a capacity model, and a capacity management module. The allocation planning module receives a demand plan for a product. The capacity management module transforms the demand plan into a machine-time-based plan according to the capacity model, and reserves capacity according to the machine-time-based plan for the demand plan. The capacity management module further transforms a purchase order received by the order management module before a cutoff date for the product into a machine-time-based order, accepts the machine-time-based order and decreases the reservation capacity depending on the machine-time-based plan.

29 Claims, 7 Drawing Sheets

U.S. PATENT DOCUMENTS

| | | | |
|---|---|---|---|
| 7,164,959 B2 * | 1/2007 | Huang et al. | 700/99 |
| 7,185,009 B2 * | 2/2007 | Yang et al. | 707/6 |
| 7,209,887 B2 * | 4/2007 | Yen et al. | 705/7 |
| 7,218,980 B1 * | 5/2007 | Orshansky et al. | 700/99 |
| 2002/0169695 A1 * | 11/2002 | Ko et al. | 705/28 |
| 2002/0194057 A1 | 12/2002 | Lidow | |
| 2003/0061958 A1 * | 4/2003 | Zhang | 101/463.1 |
| 2003/0135297 A1 | 7/2003 | Chang et al. | |
| 2004/0254825 A1 * | 12/2004 | Hsu et al. | 705/8 |
| 2005/0038684 A1 * | 2/2005 | Wang et al. | 705/8 |
| 2005/0044012 A1 * | 2/2005 | Huang et al. | 705/28 |
| 2005/0052352 A1 * | 3/2005 | Huang et al. | 345/60 |
| 2005/0137732 A1 * | 6/2005 | Chao et al. | 700/100 |
| 2005/0144056 A1 * | 6/2005 | Wang et al. | 705/8 |
| 2006/0038746 A1 * | 2/2006 | Zhang | 345/43 |
| 2006/0088772 A1 * | 4/2006 | Zhang | 430/5 |
| 2007/0137733 A1 * | 6/2007 | Dong et al. | 148/105 |

FOREIGN PATENT DOCUMENTS

TW           515967       1/2003

OTHER PUBLICATIONS

Taiwan Patent Office Office Action.

\* cited by examiner

| Product ID | Route ID | tool 1 | m-h | tool 2 | m-h | ... | tool n | m-h |
|---|---|---|---|---|---|---|---|---|
| | | step 1 | | step 2 | | | step n | |

Steps

FIG. 2

SYSTEM AND METHOD OF DEMAND AND CAPACITY MANAGEMENT

BACKGROUND OF THE INVENTION

1. Field of the Invention

The present invention relates to supply chain management, and particularly to a system and method for a manufacturer or a product or service supplier to plan and manage its capacity so as to serve its customers' demands in the field of supply chain management.

2. Description of the Related Art

In the supply of products, the supply chain performs the functions of purchase of materials, transformation of these materials into intermediate and finished products, and distribution of these finished products to customers. The supply of services is in many ways similar to the supply of products. In the supply chain, customers transmit requests (or demands) that may include a request for a particular quantity of a product to a supplier by a specific date. The supplier plans its internal or external manufacturing schedule according to these received requests to satisfy each customer.

To strengthen competitive ability, supply chain management (or the management of supply chain functions and operations) has become an important issue to meet the goals of reduced inventory and increased productivity. Manufacturing and distribution facilities have limited resources and capacity. That is, not every customer request may be met, in that some may be promised but unfulfilled, some may get inadequate supply, and others may be rejected. Consequently, effective management (of both demand and capacity) in supply chain management, without excess capacity loss, has become an important aspect for a product or service supplier who needs to control manufacture or distribution.

The complexity of the supply chain may vary greatly from industry to industry and firm to firm. For a supplier whose business model involves long manufacturing cycle time but accurate time-to-delivery, high equipment cost, and high product value, demand and capacity management is even more critical. Integrated circuit (IC) foundry is such a business which needs to serve multiple customers with a wide spectrum of products, while the manufacturing process for a given product can not start before an order is given. Therefore, an IC foundry is facing a more difficult situation in its supply chain management.

In conventional methods, the supply chain management is used to manage and control related materials used in manufacturing steps. For example, U.S. Pat. No. 6,477,660 discloses a system for supply chain planning that manages material using a specified data model. However, this method is not suitable for a business in which the materials are not the key factor of supply chain management. Sometimes it may be more important to manage equipment (either manufacturing or distribution) utilization rate (as opposed to materials) for better capacity management.

Further, conventionally, demand and capacity management is often based on quantity. For example, the system and method for managing available to promised product of U.S. Pat. No. 6,188,989 manages capacity by quantity. By such conventional quantity-based method, the capacity of an IC foundry is represented by the quantity of wafers available to promise customers. However, the manufacturing process of an IC product may involve several tools and hundreds of steps, while an advanced IC product (such as a 0.13 um CPU) may need even more than double cycle time, mask cost and equipment cost of that of a much less advanced IC product (such as a 0.35 um game ROM). Thus, it can be readily seen that one 8-inch wafer for 0.13 um products is not at all equivalent to one 8-inch wafer for 0.35 um products, and it would not be reliable or accurate to measure capacity requirement by wafer quantity.

Consequently, the desired results of the conventional supply chain management tools are often not achievable or cannot be realistically implemented in an IC foundry or a business having a similar business model. There is no existing effective mechanism for demand and capacity management that is ideally suited for industries like IC foundries, and further no total solution is specially designed and proposed for supply chain management in such industries.

In addition, to achieve precise supply chain management, both customer and foundry requirements should be thoroughly considered. In most cases, the relationship between a customer and a foundry is not long-term one-to-one relationship. The customer does not promise to order, and the foundry does not promise to retain capacity.

From customer's perspective, wafer costs are high, while a product is not a staple material, in that the product may have only a short life cycle and soon be volatile. Consequently, delivery date and quantity management are critical in reducing customer's costs.

Generally, customers desire to control delivery date and quantity through planning and forecasting. Customers also wish the foundry (supplier) to become their virtual factory so as to lower the impact of marketing fluctuations, and reduce the cost of maintaining capacity. This naturally leads to overestimation of the demand by customers in order to book the capacity, and the foundry (supplier) consequently frequently over-commits in order to reduce order and capacity loss. This "distrust" between the customer and the foundry has become a major problem in supply chain management. Therefore, balancing and satisfying all customers, without losing capacity is a key challenge to supply chain management in the semiconductor industry.

SUMMARY OF THE INVENTION

The present invention is proposed to solve the aforementioned issues. It should be noted that, although this invention will be described from the perspective of an IC foundry, its concept and spirit should not be limited to IC foundries but may be applicable to other product or service supply chains.

Accordingly, it is an object of the present invention to provide a system and method of demand and capacity management with machine-time accuracy.

It is another object of the present invention to propose a new business model for a foundry supply chain management total solution, which may be applicable to IC or other foundry businesses.

To achieve the above and other objects, the present invention defines a new business model for certain industries (like IC foundries), providing a significantly improved supply chain management solution. The business model of one embodiment of the invention includes management aspects of multiple stages in a supply chain. In one embodiment, the business model provides management aspects relating to: (1) customer-specific allocation of products, (2) purchase order allocation and delivery commitment dates, (3) customer-specific product handling; and (4) completed product handling and shipment.

In one embodiment, a method for demand and capacity management is provided. In accordance with the embodiment, the method receives a demand plan for a product from a participating customer and provides a capacity model having route information for the product, wherein the route information records a plurality of tools and corresponding machine hours (time). Then, the method transforms the demand plan into a machine-time-based plan according to the route information in the capacity model, and reserves capacity according to the machine-time-based plan for the demand plan.

BRIEF DESCRIPTION OF THE DRAWINGS

The aforementioned objects, features and advantages of this invention will become apparent by referring to the following detailed description of the preferred embodiment with reference to the accompanying drawings, wherein:

FIG. 2 illustrates the route structure according to an embodiment of the present invention;

DETAILED DESCRIPTION OF THE INVENTION

Figure 1:
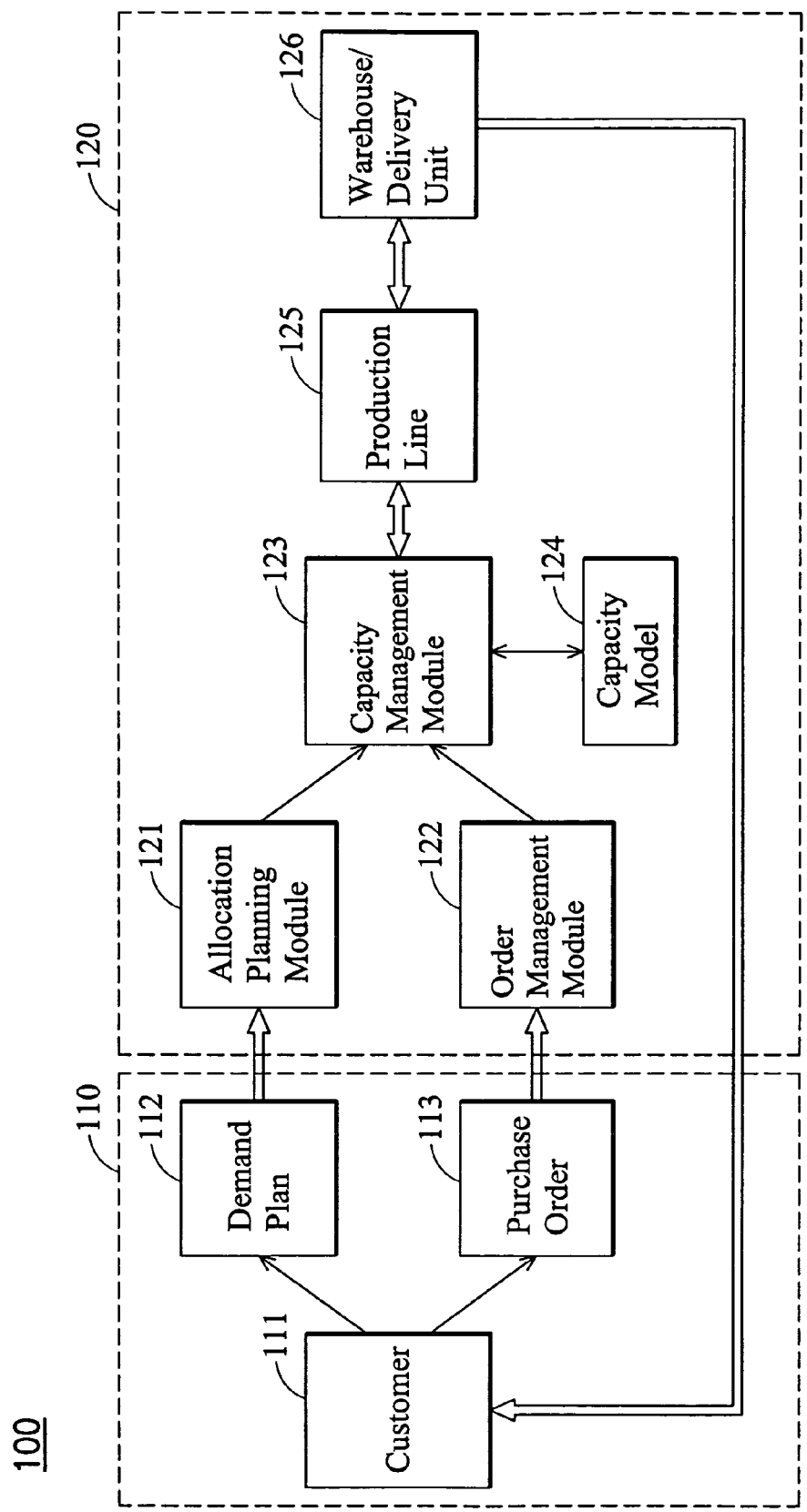
FIG. 1 is a schematic diagram illustrating the architecture of the system of demand and capacity management with machine-time accuracy according to one embodiment of the present invention.

Before making specific reference to the drawings, a higher-level description will first be provided with regard to aspects of the invention.

In foundry (including IC and other foundry) business, one widely used model is the so-called "build-to-order" model. There are two typical forms of this "build-to-order" business model. In one of the forms, a supplier prepares its capacity based on actual order, and utilizes the capacity also based on actual orders. Usually this model involves a long term contract. The supplier gets the benefit of stable capacity utilization rate, while the customer gets the benefit of stable and short lead time, and low inventory. However, when there is market fluctuation, the customer has to suffer the risk.

In another typical form of the build-to-order model, a supplier prepares its capacity based on its own forecast, and utilizes its capacity based on actual orders. A customer does not have to promise any long term order, so it gets the benefit of low business risk. However, the downside is that the customer has to suffer unstable and longer lead time, and therefore may need to prepare higher inventory. The supplier suffers instability of capacity utilization rate.

In contrast with this build-to-order model, there is a relatively unique foundry business model in which a supplier prepares its capacity based on customers' demand plans (customers' forecast plans), and utilizes its capacity based on both the demand plans and actual orders. In this model, the supplier instead of its customers takes the risk of market fluctuation. The customers get the benefits of the long-term contract build-to-order model but shift its market fluctuation risk to its supplier.

From supplier's perspective, the third model involves a greater risk but serves customers better. The pre-requisite of this model is precise supply chain management. If this can be done, the supplier would gain competitive advantage against its competitors to serve the same customers.

To achieve more precise supply chain management, as aforementioned in the background, conventional material-based or quantity-based mechanisms are not applicable to this unique model. The inventors of this invention have found that, in IC foundry business, the key factor which need precise control is the machine-time consumption.

AS described above, this invention proposes a machine-time-based mechanism for supply chain management to deal with the above issues, and is believed to be a total solution for IC foundry supply chain management and other similar businesses.

In accordance with an embodiment of the invention, an IC foundry supply chain management is machine-time based. An embodiment of the present invention provides a system and method of demand and capacity management with machine-time accuracy. The system includes an allocation planning module, an order management module, a capacity model, and a capacity management module.

The allocation planning module receives a demand plan for a product from a participating customer. The capacity management module transforms the demand plan into a machine-time-based plan according to the route information in the capacity model, and reserves capacity according to the machine-time-based plan for the demand plan.

The order management module receives a purchase order for the product from a participating customer before a cutoff date, and the capacity management module rejects an order sent from other customers before the cutoff date. The capacity management module transforms the purchase order into a machine-time-based order according to the route information in the capacity model, accepts the machine-time-based order and decreases the reservation capacity depending on the machine-time-based plan.

The capacity management module further releases the reservation capacity as remnant capacity if the cutoff date passes, permits the order management module to receive a second purchase order for a second product after the cutoff date for the product, transforms the second purchase order into a second machine-time-based order according to the capacity model, accepts the second machine-time-based order and decreases the remnant capacity.

The capacity management module may further utilize a swap mechanism to exchange the reservation capacity to meet a third purchase order sent from the participating customer if the third purchase order is not compatible with the demand plan.

Further, the system includes a production line to manufacture the product according to the purchase orders, and a delivery unit to deliver the product.

FIG. 1 illustrates the architecture of an embodiment of a system of demand and capacity management with machine-time accuracy.

The system 100 includes a customer side 110 and a manufacturer side 120. On the customer side 110, the customer 111 forecasts its demand plan 112 of at least one product and transfers the demand plans 112 and issues and sends purchase orders 113 to the manufacturer side 120. The demand plans 112 may contain identification and quantity of the product.

On the manufacturer side 120, the allocation planning module 121 receives the demand plan 112 from the customer 111, and generates an allocation plan according thereto. The allocation plan may be the customer support plan for the product, and records rough capacity distribution and schedule for the product. The allocation planning module 121 may provide an inventive mechanism to solve the demand-supply mismatching problem in IC foundries, so as to match the customer demand with the capacity supplied by the manufacturer to obtain a highest demand fulfillment rate and a highest supply utilization rate, and to satisfy both customers and the manufacturer. In addition, the allocation planning module 121 further provides a re-assignment mechanism to secure and protect committed capacity if adjustment in the IC foundry occurs, such as the recipe or equipment parameters are adjusted.

In addition, the order management module 122 receives the purchase order 113 for the product from the customer 111, and arranges capacity to meet customer demand. It should be noted that the received demand plan 112 and the purchase order 113 should be stored in databases. Since supply chain management is a complicated job, and the ESCM system is a serial data process system with multi-engine (multi-process) and multi-database, the databases in the ESCM system should be symmetric to avoid engine crashes or planned results errors. Therefore, a symmetrical database mechanism can be employed to filter the original databases including the order database, WIP (Work In Process) database, product information database, technology information database, customer information database, and/or other information database into symmetrical databases in advance.

The capacity can be managed by the capacity management module 123 using the capacity model 124, as follows. It should be noted that the capacity is preferably machine-time oriented in the present invention. That is, representing the capacity by tools with unit time. Note that IC products in the IC foundry are discussed in the embodiment, but the present invention can be applied to many other factories and industries.

The capacity model 124 records the routes of all products in the IC foundry. The route structure includes a product ID, route ID, and a plurality of steps as shown in FIG. 2. Each product has its own route, and each step records the tool and corresponding machine hours (m-h) spent thereon. Once the demand plan 112 is received, the route for the product corresponding to the demand plan 112 is retrieved from the capacity model 124, and the capacity management module 123 uses the route information to reserve capacity for the customer 111.

Figure 3:
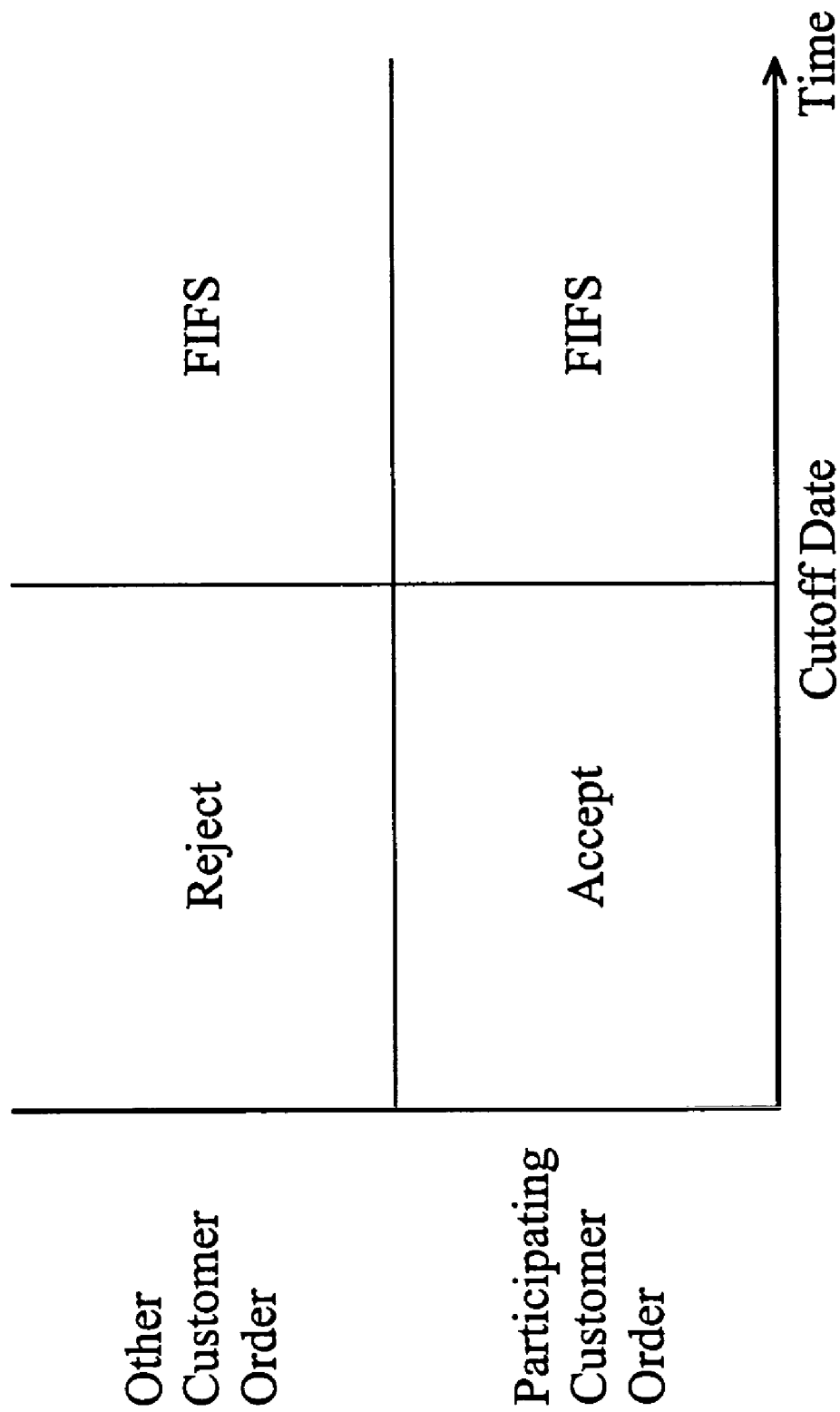
FIG. 3 is a schematic diagram illustrating the strategy of capacity management according to an embodiment of the present invention.

When the purchase order 113 is received, the capacity management module 123 manages the capacity according to the strategy shown in FIG. 3. Before the cutoff date, the capacity management module 123 accepts the order and commits a delivery date and quantity depending on the demand plan if the order is from the participating customer and, otherwise, rejects the order. After the cutoff date, the capacity management module 123 follows the first in first serve (FIFS) rule to accept all received orders and commits a delivery date and a delivery quantity depending on the remnant capacity. Similarly, the cutoff date may differ with products, and the cutoff date can be set as the cycle time for the product or the cycle time with extra buffer time.

In the embodiment, the customer 111 prepares the demand plan 112 in advance, and transmits purchase order 113 before the cutoff day, such that the manufacturer side 120 can prepare and retain capacity to meet customer demands of quantity and delivery date before the cutoff date. To increase the capacity utilization, the manufacturer side 120 opens the remnant capacity for all customers after the cutoff date.

In addition, the capacity management module 123 can meet customer demand through a swap mechanism when the purchase order is not equal to demand plan. In one case, the capacity reserved for the product in the demand plan or a buffer capacity can be exchanged to another product specified in the purchase order. It should be noted that if the quantity of the purchase order is less than the quantity of the demand plan, the capacity reserved for the customer is released after the cutoff date.

Figure 4:
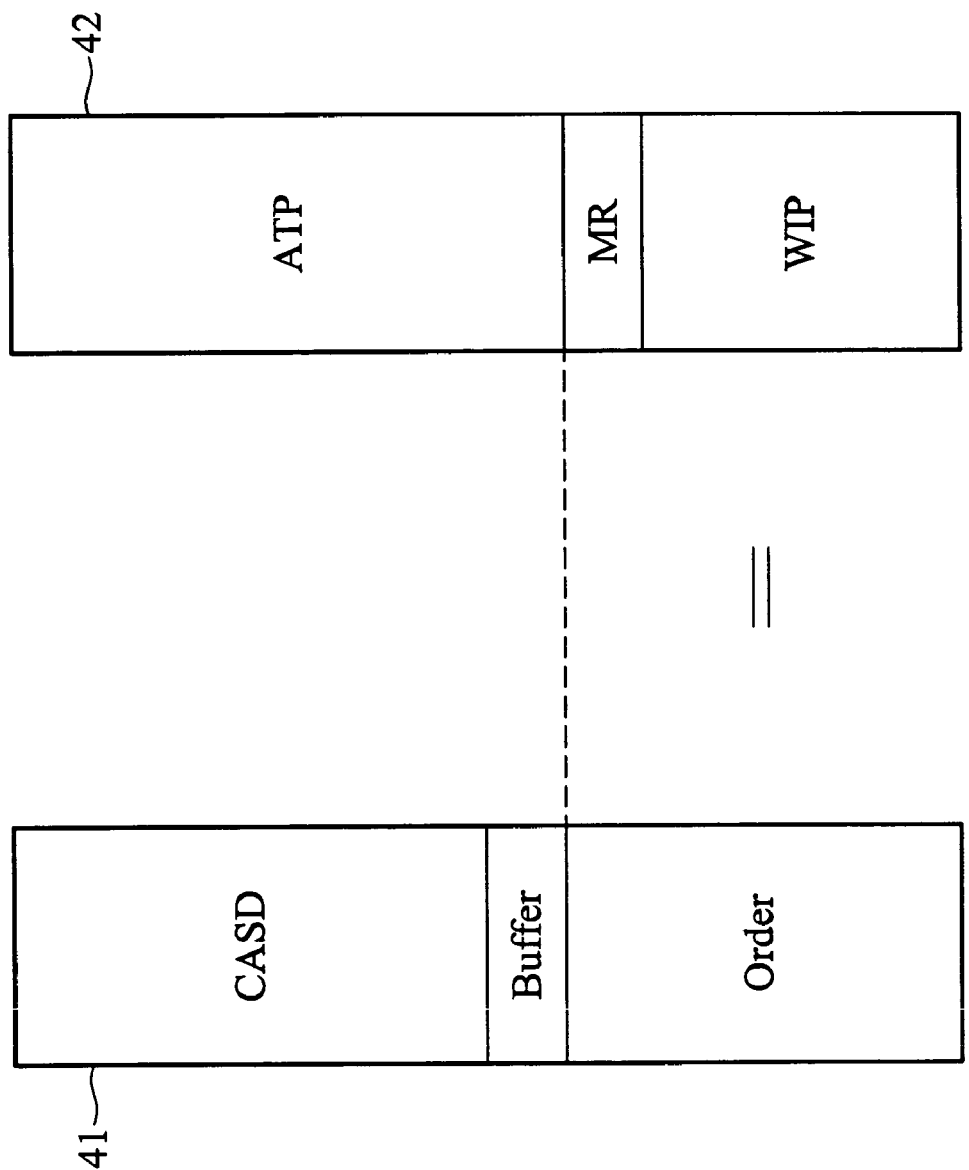
FIG. 4 is a schematic diagram illustrating the relation between the demand and capacity according to an embodiment of the present invention.

The relation between the demand 41 and capacity 42 is shown in FIG. 4. In FIG. 4, the capacity available to promise (ATP) is always larger than or equal to the capacity available support demand (CASD) to protect the customer demand, thus all orders have sufficient capacity to meet demand. Further, the buffer can be used for the swap mechanism. When the order is received, the CASD is decreased and the production line 125 can prepare material requirement (MR) and start manufacture WIP, work in process. Note that the sum of the MR and WIP is equal to the order.

It also should be noted that the situation of the IC product corresponding to the purchase order, such as the stage of fabrication process, can be monitored by the customer through a network, such as Internet.

Figure 5:
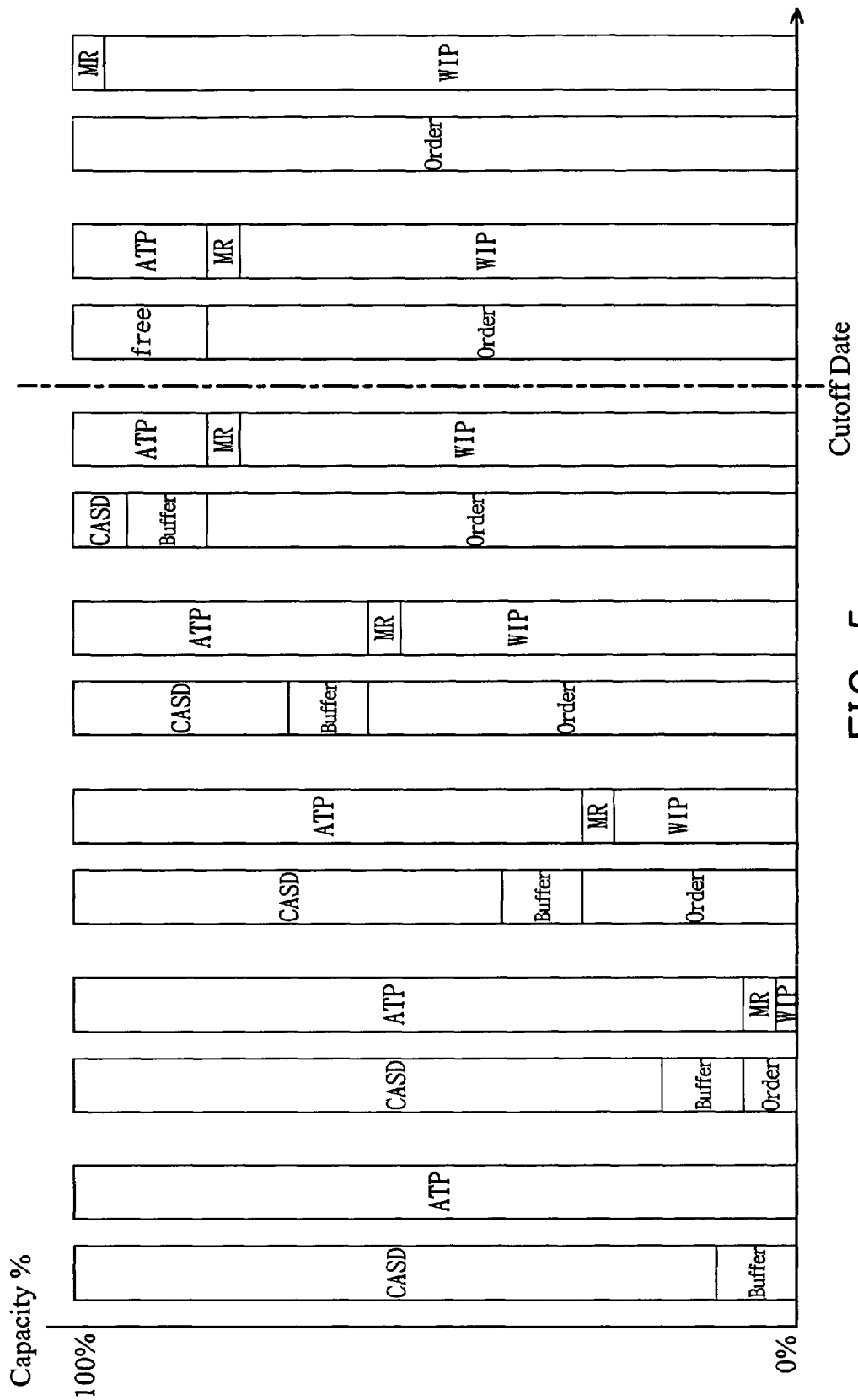
FIG. 5 shows an example of demand and capacity management according to an embodiment of the present invention.

FIG. 5 shows an example of demand and capacity management. The capacity management module 123 follows the demand plan to accept the purchase order before the cutoff date. After the cutoff date, the CASD is released and the capacity management module 123 can accept all customer orders and serve in FIFS. Since the present invention is machine-time oriented, the available machine hours of corresponding tools recorded in the route for the product are increased when the CASD is released. The released machine hours of respective tools meet other products. In this manner, the total capacity can be used efficiently up to 100% after the cutoff date.

As described above, the production line 125 follows the rules described in the FIG. 4 to prepare material requirement and manufacture the product when the purchase order is received. During the production period, several functions can be performed in the production line 125 to ensure the capacity of each customer, and match the delivery commitment date. For example, a frozen MPS mechanism may be adopted to fix the MPS date to ensure the products can be manufactured on the date without delay if the situation, such as the recipe and equipment of the IC foundry is changed or a hot run order is taken.

After the products are manufactured, the warehouse/delivery unit 126 forwards the products to the customer 111 or other factories as specified by the customer 111. It should be noted that the warehouse/delivery unit 126 may perform automatic pick, pre-pick, and other functions to allow the customer to change the specified location and factory before the products are transferred.

Figure 6:
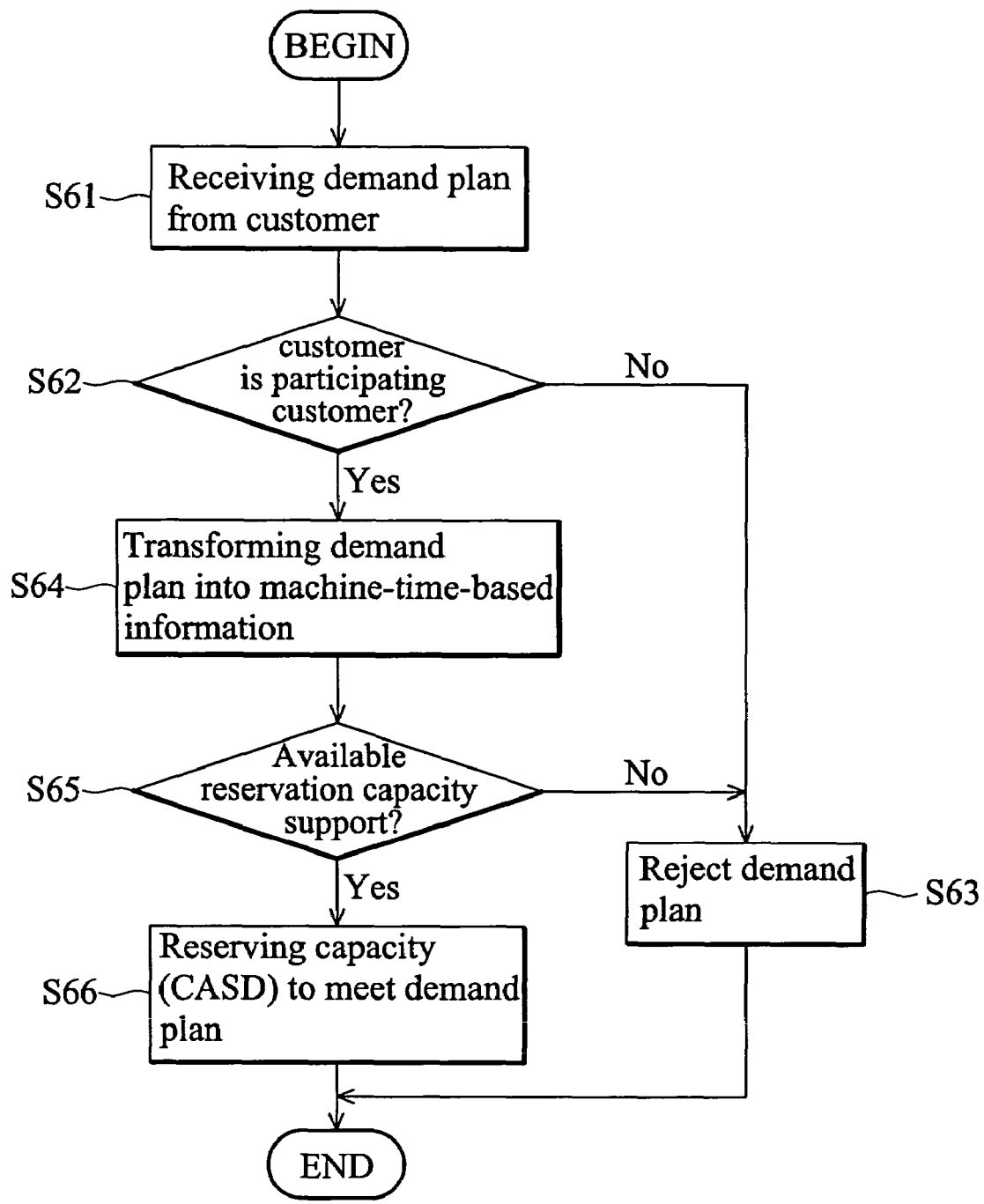
FIG. 6 is a flowchart showing the process of capacity reservation according to an embodiment of the present invention.

FIG. 6 shows the process of capacity reservation according to an embodiment of the present invention. In step S61, the allocation planning module 121 receives the demand plan 112 from a customer 111. Then, in step S62, the participation status of customer 111 is checked.

If the customer 111 is not a participating customer, (No in the S62), in step S63, the demand plan 112 is rejected. If yes (Yes in the S62), in step S64, the demand plan 112 is transformed into the demand plan with machine hour information using the capacity model 124. Afterward, in step S65, the available reservation capacity is checked if it can support the demand plan 112. If not (No in step S65), in step S63, the demand plan 112 is rejected. If yes (Yes in step S65), in step S66, the capacity is reserved for the demand plan 112 of the customer 111. The ratio of capacity for reservation can set according to the field of the manufacturer.

Figure 7:
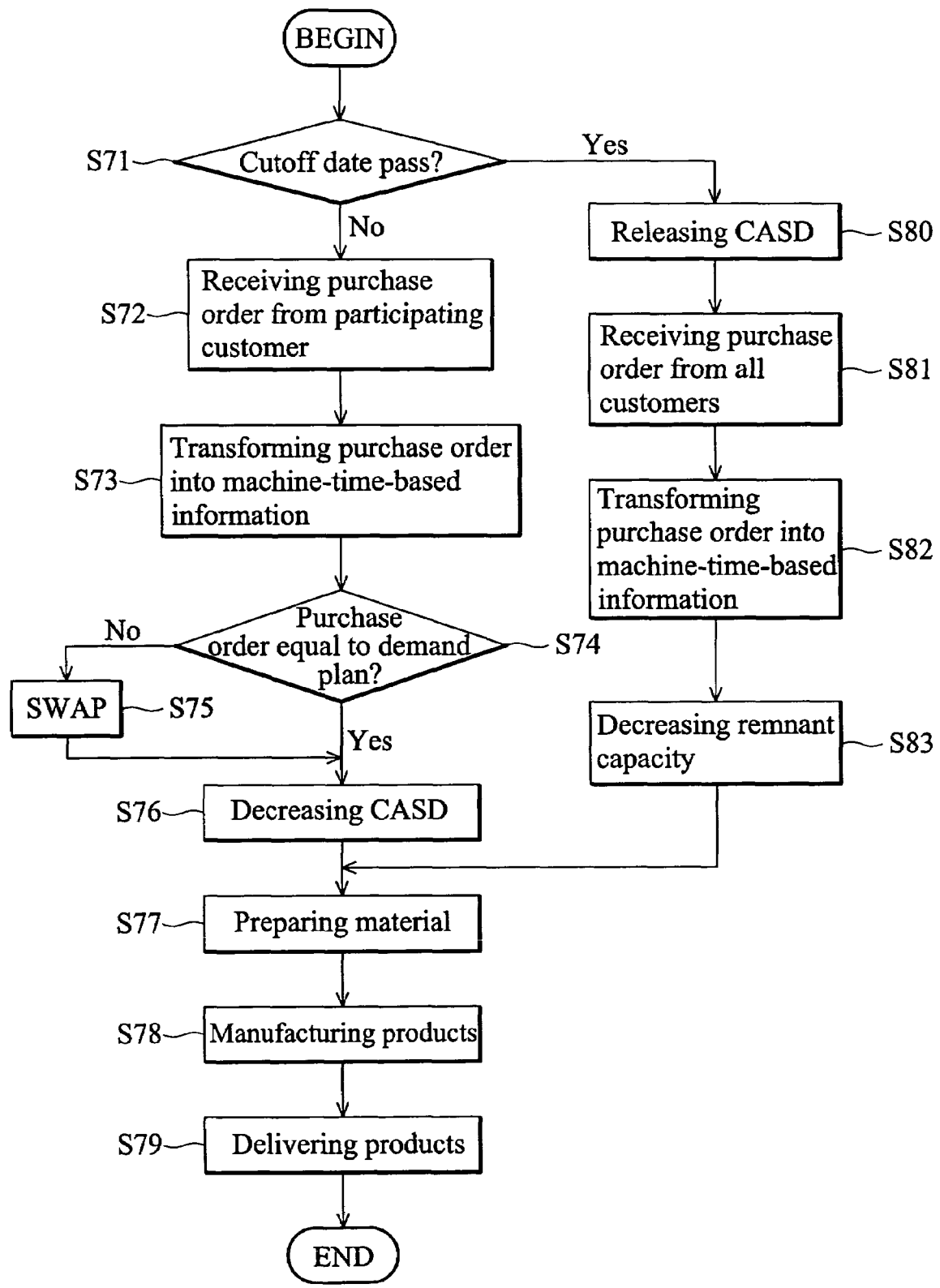
FIG. 7 is a flowchart showing the process of demand and capacity management according to an embodiment of the present invention.

FIG. 7 shows the process of demand and capacity management according to the present invention.

First, in step S71, the capacity management module 123 checks whether the cutoff date has passed. If no (No in step S71), in step S72, the purchase order 113 is received from the participating customer. Before the cutoff date, orders from other customers are rejected. Then, in step S73, the purchase order 113 is transformed into the purchase order with machine hour information using the capacity model 124.

Afterward, in step S74, the purchase order 113 is checked for conformation with the demand plan. If no (No in step S74), in step S75, the swap mechanism enables exchange of reservation capacity for the purchase order 113. If yes (Yes in step S74), in step S76, the CASD corresponding to the demand plan 112 is decreased according to the purchase order. Thereafter, in step S77, the related materials are prepared, and in step S78, the production line starts to manufacture the products, such as IC products corresponding to the purchase order using the assessed capacity. After the products are completed, in step S79, the warehouse/delivery unit 126 may forward the products to the customer 111.

In addition, if the cutoff date passes (Yes in the S71), in the step S80, the remnant CASD of the customer 111 is released into the remnant capacity, and in step S81, all customer orders are received and served by FIFS. Then, in step S82, the purchase order is transformed into the purchase order with machine hour information using the capacity model 124. Then, in step S83, the remnant capacity is decreased according to the purchase order. Thereafter, in step S77, related materials are prepared, and in step S78, the production line starts to manufacture the products using the assessed capacity. After the products are completed, in step S79, the warehouse/delivery unit 126 may forward the products to the customer 111.

As a result, using the system and method of demand and capacity management with machine-time accuracy according to the present invention, capacity can be based on machine hours, and managed accurately. In addition, using the proposed new business model of supply chain management for IC foundries and the ESCM system implemented according to the new business model, the customers capacity may be satisfied according to a demand plan and products as per requirements, and the planned result of the ESCM system is achievable and can be readily implemented in IC foundry environments, thereby satisfying requirements of customers and manufacturers.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method of demand and capacity management with machine-time accuracy, comprising the steps of:
   receiving a demand plan for a product from a participating customer, wherein the demand plan is quantity-based, and designates a specific quantity of the product;
   providing a capacity model having route information for the product, wherein the route information records a plurality of tools that used for producing the product, and corresponding machine time that the product spent on the respective tools;
   transforming the quantity-based demand plan into a machine-time-based plan according to the route information in the capacity model and the specific quantity of the product, wherein the machine-time-based plan indicates specific machine times for the respective tools; and
   reserving capacity according to the machine-time-based plan, wherein the capacity is machine-time-based, and represented by machine times of the respective tools.

2. The method of claim 1 further comprising receiving a purchase order for the product from the participating customer before a cutoff date for the product.

3. The method of claim 2 further comprising transforming the purchase order into a machine-time-based order according to the route information in the capacity model, accepting the machine-time-based order, and decreasing the reservation capacity depending on the machine-time-based plan.

4. The method of claim 3 further comprising rejecting an order sent
   from other customers before the cutoff date.

5. The method of claim 4 further comprising releasing the reservation capacity as remnant capacity after the cutoff date passes.

6. The method of claim 5 further comprising receiving a second purchase order for a second product after the cutoff date for the product.

7. The method of claim 6 further comprising transforming the second purchase order into a second machine-time-based order according to the capacity model, accepting the second machine-time-based order, and decreasing the remnant capacity.

8. The method of claim 2 further comprising performing a swap mechanism to exchange the reservation capacity to meet a third purchase order sent from the participating customer if the third purchase order is not compatible with the demand plan.

9. The method of claim 2 further comprising manufacturing the product according to the purchase order.

10. The method of claim 9 further comprising delivering the product to participating customer.

11. The method of claim 2 wherein the cutoff date is the cycle time for the product.

12. The method of claim 2 wherein the cutoff date is the cycle time for the product plus a predefined time for buffer.

13. A method of demand and capacity management in an IC foundry, comprising the steps of:
   receiving a demand plan corresponding to an IC product from a participating customer, wherein the demand plan is quantity-based, and designates a specific quantity of the IC product;
   providing a capacity model having route information of the IC product, wherein the route information records a plurality of tools that used for producing the IC product, and corresponding machine time that the IC product spent on the respective tools;
   transforming the quantity-based demand plan into a machine-time-based plan according to the route information in the capacity model and the specific quantity of the product, wherein the machine-time-based plan indicates specific machine times for the respective tools; and
   reserving capacity according to the machine-time-based plan, wherein the capacity is machine-time-based, and represented by machine times of the respective tools.

14. The method of claim 13 further comprising receiving a purchase order corresponding to the IC product from the participating customer before a cutoff date of the IC product.

15. The method of claim 14 further comprising transforming the purchase order into a machine-time-based order according to the route information in the capacity model, accepting the machine-time-based order, and decreasing the reservation capacity depending on the machine-time-based plan.

16. The method of claim 15 further comprising rejecting an order sent from other customers before the cutoff date.

17. The method of claim 16 further comprising releasing the reservation capacity as remnant capacity if the cutoff date passes.

18. The method of claim 17 further comprising receiving a second purchase order corresponding to a second IC product after the cutoff date of the IC product.

19. The method of claim 18 further comprising transforming the second purchase order into a second machine-time-based order according to the capacity model, accepting the second machine-time-based order, and decreasing the remnant capacity.

20. The method of claim 14 further comprising performing a swap mechanism to exchange the reservation capacity to meet a third purchase order sent from the participating customer if the third purchase order is not compatible with the demand plan.

21. The method of claim 14 further comprising manufacturing the IC product according to the purchase order.

22. The method of claim 21 further comprising delivering the IC product to participating customer.

23. The method of claim 14 wherein the cutoff date is the cycle time of the IC product.

24. The method of claim 14 wherein the cutoff date is the cycle time of the IC product plus a predefined time for buffer.

25. A method of IC product manufacturing, comprising the steps of:
   receiving a demand plan corresponding to an IC product from a participating customer, wherein the demand plan is quantity-based, and designates a specific quantity of the IC product;
   providing a capacity model having route information of the IC product, wherein the route information records a plurality of tools that used for producing the IC product, and corresponding machine time that the IC product spent on the respective tools;
   transforming the quantity-based demand plan into a machine-time-based plan according to the route information in the capacity model and the specific quantity of the product, wherein the machine-time-based plan indicates specific machine times for the respective tools;
   reserving capacity according to the machine-time-based plan, wherein the capacity is machine-time-based, and represented by machine times of the respective tools;
   receiving a purchase order corresponding to the IC product from the participating customer before a cutoff date of the IC product;
   transforming the purchase order into a machine-time-based order according to the route information in the capacity model;
   accepting the machine-time-based order and decreasing the reservation capacity depending on the machine-time-based plan; and
   manufacturing the IC product corresponding to the purchase order using the assessed capacity.

26. The method of claim 25 further comprises the steps of:
   rejecting an order sent from other customers before the cutoff date;
   releasing the reservation capacity as remnant capacity if the cutoff date passes;
   receiving a second purchase order corresponding to a second IC product after the cutoff date of the IC product;
   transforming the second purchase order into a second machine-time-based order according to the capacity model; and
   accepting the second machine-time-based order and decreasing the remnant capacity.

27. The method of IC product manufacturing as claimed in claim 25 further comprising performing a swap mechanism to exchange the reservation capacity to meet a third purchase order sent from the participating customer if the third purchase order is not compatible with the demand plan.

28. The method of IC product manufacturing as claimed in claim 25 wherein the cutoff date is the cycle time of the IC product.

29. The method of IC product manufacturing as claimed in claim 25 wherein the cutoff date is the cycle time of the IC product plus a predefined time for buffer.

* * * * *